Dec. 30, 1930.   F. G. HODSDON   1,786,846
MILKING MACHINE
Filed March 2, 1928
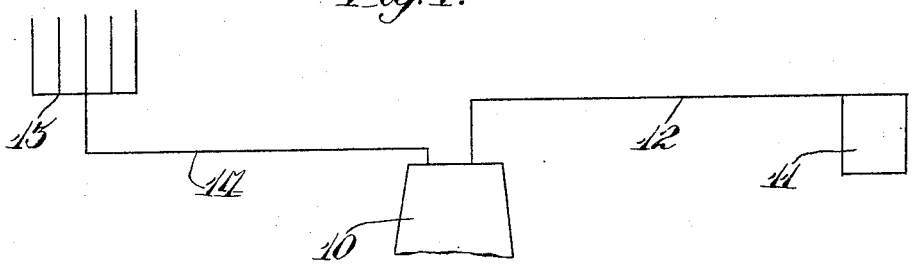
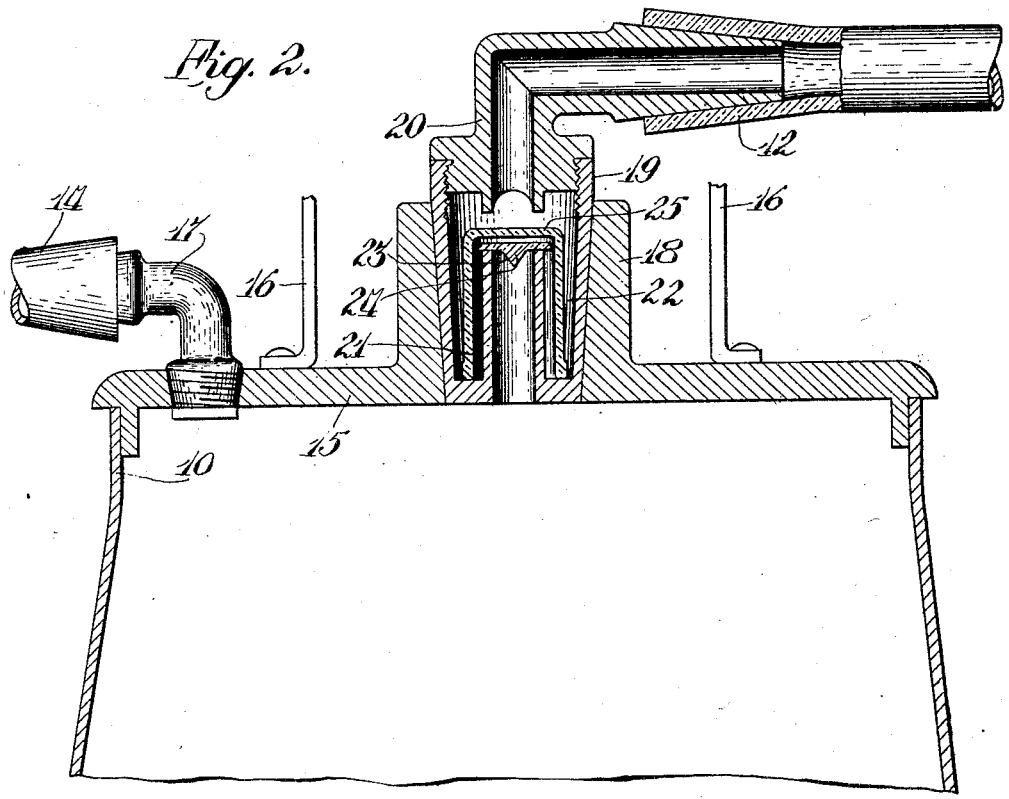
Inventor
Floyd G. Hodsdon.
By
Atty.

Patented Dec. 30, 1930

1,786,846

UNITED STATES PATENT OFFICE

FLOYD G. HODSDON, OF CHICAGO, ILLINOIS, ASSIGNOR TO INTERNATIONAL HARVESTER COMPANY, A CORPORATION OF NEW JERSEY

MILKING MACHINE

Application filed March 2, 1928. Serial No. 258,503.

This invention is in the art of milking machinery.

A milking machine system, as standard in the art, comprises a teat cup cluster, a milk delivering connection leading into a milk receiver pail, which pail is maintained under partial vacuum by an eduction connection for exhausting air from the pail by means of a vacuum pump. Sometimes condensation water which forms in the eduction line, or milk which was accidentally lifted from the receiver pail into said line, is reversed and accidentally flows from the said line, even against the flow of air, back to the pail. This, of course, contaminates the milk. It is very important, therefore, that means be provided for preventing the accidental return of milk and condensation water from the eduction line into the pail.

Thus, the invention particularly relates to a check valve and trap structure arranged in the cover, with which these pails are usually provided, to prevent the objectionable reverse flow mentioned.

The general object of this invention is to provide a simple construction for preventing drainage from the air exhaust line back into the milk receiver pail. A more specific object is to provide an improved check valve and trap adapted to be mounted in the pail cover for the purposes stated. Other objects will undoubtedly appear to those skilled in this art as the disclosure progresses.

These desirable objects are obtained by the mechanism illustrated in the accompanying sheet of drawings, wherein:

Figure 1 is a diagrammatic view of a standard milking machine system; and

Figure 2 is a vertical, sectional view through the upper end of the milk receiver pail and associated mechanism.

In Figure 1 it will be seen that the system includes a milk receiver pail 10 maintained, when in use, under a partial vacuum by means of a vacuum pump 11 and eductor connection 12. The teat cup cluster is shown at 13, and the milk line at 14, which delivers the milk into the pail 10, as is usual in this art. Some of these parts are shown in detail in Figure 2.

The pail has a cover 15 provided with a handle, parts of which are generally shown at 16. The cover carries an inflow nipple 17 to which is connected the milk line piping 14. In this manner milk from the teat cups 13 enters the pail. As has been indicated already, the pail is maintained under a partial vacuum. The connections for doing this, which include the trap and check valve of this invention will next be described.

The can cover is formed with a taper socket nipple 18 into the socket of which is fitted a tapered valve plug 19, the same being hollow and having its inner, upper end threaded to receive a nipple 20, to which is connected the eduction line hose 12. By means of these connections, the pump 11 is enabled to exhaust air from the pail to maintain the same under partial vacuum. The plug 19 is of a peculiar construction in that it has integrally formed therewith, an inner upstanding tube 21 spaced from the inner side of the plug to leave a trap chamber 22. The top of the tube 21 is closed by a gravity seated check valve 23 having a nib 24 to center the same on the tube. Fitted over the tube, and spaced therefrom, and resting on the bottom of the trap chamber 22, is another gravity seated valve in the form of an inverted cup, as shown at 25.

In operation, suction through the connections 12 and 20 causes air to be exhausted from the pail, and milk to enter the pail from connection 17. The passage of the exhausted air through the check and trap structure described will be up the tube 21, under the seat of check valve 23, and out of the said tube, then downwardly to the bottom of the trap chamber whence the air passes under the seat of trap valve 25 and finally upwardly and out the said connections 20 and 12. As has been stated, milk might accidentally be pulled from the pail into the eduction line 12. Also, condensation water might form in this line. Should such milk or water reversely flow in the direction of the pail, it would be caught in the trap chamber 22 and thus be kept out of the pail. Passage of the exhaust air under the trap valve 25 keeps the liquid drained away in the space between the tube 21 and valve 25 from the seat of check valve 23 at the top of said tube 21 and down to the seat of the trap valve 25 at the bottom of the trap chamber 22. When the hose 12 is removed from the nipple 20, both the trap and check valves close, thereby keeping the vacuum in the milk pail so the pail may be lifted by the milk pail top handle 16. When it is desired to clean the trap chamber, the hose 12 is first removed from the nipple 20. Then the valve plug 19 is unseated and removed from the pail cover. The nipple 20 is unscrewed from the plug 19, thus exposing the trap chamber for draining and cleaning.

The illustrative embodiment of the invention just described achieves all of the desirable objects heretofore mentioned.

It is the intention to cover all such changes and modifications of the arrangement shown that do not materially depart from the spirit and scope of the invention, as is indicated in the following claims.

What is claimed is:

1. A valve for the purpose stated, said valve comprising a plug having an open upper end closed by a detachable nipple connection, the plug being hollow with its bottom end serving as a floor formed with an upstanding tube to leave a trap chamber, a check valve resting loosely on the upper end of the tube, and a trap valve surrounding the tube and resting loosely on the floor of the trap chamber.

2. A valve for the purpose stated, said valve comprising a tapered plug having an open upper end closed by a detachable nipple connection, the plug being hollow and formed with an integral upstanding tube spaced from the inner wall of the plug to leave a trap chamber in the plug, a check valve on top of the tube to close the same, and an inverted cup-shaped trap valve surrounding the tube and resting loosely on the floor of said chamber.

3. A valve for a milking machine including a pail having a cover formed with a socket, said valve comprising a hollow, vertically disposed, removable plug arranged in the socket, said plug being open at its top and also being formed with an inner relatively high, upstanding tube surrounded by a trap chamber, a check valve loosely carried on top of the tube, and a nipple leading from the plug and including a part to removably fit and close the open end of the plug.

4. A valve for a milking machine including a pail having a cover formed with a tapered socket, said valve comprising a tapered, removable plug arranged vertically in the socket and having an open end, said plug being hollow to form a trap chamber, an upstanding tube in the plug rising centrally a substantial distance from the bottom of the chamber, a check valve carried on the tube, and an eduction line nipple removably connected to the plug and formed to close the open end of the plug.

5. A valve for a milking machine including a pail having a cover formed with a socket, said valve comprising a removable plug arranged vertically in the socket and having an open end, the plug being formed with an inner upstanding tube surrounded by a trap chamber, a check valve loosely carried on top of the tube, a trap valve surrounding the tube and spaced therefrom and seated on the floor of the chamber a substantial distance below the check valve, and an eduction line nipple fixture mounted on the plug, said fixture including a cap to close the open end of the plug.

6. A valve for a milking machine including a pail having a cover formed with a tapered socket, said valve comprising a tapered, removable plug arranged vertically in the socket, said plug being open at its top and hollow to form a trap chamber, an upstanding tube in the plug rising centrally from the bottom of the chamber, a check valve carried on the tube, an inverted cup-shaped trap valve arranged over the tube and resting loosely on the floor of the trap chamber a substantial distance below the check valve, and a removable cap including an eduction line nipple mounted on the plug to close the open top end thereof.

7. A valve plug having a top end carrying a nipple, a bottom end, said plug being hollow to form an inner trap chamber, an upstanding tube formed on the bottom end and extending to a point adjacent the top end of the plug, a check valve loose on the top end of the tube, and a trap valve surrounding the tube and having one end thereof resting loosely on the bottom end of the plug.

8. A valve plug hollowed out to form an inner chamber, an upstanding tube therein and formed as a part thereof, a check valve seated on the tube, and a trap valve seated on the floor of the chamber and surrounding the tube and check valve, the seats for the said valves lying respectively in relatively widely spaced apart horizontal planes.

9. A valve plug hollowed out to form an elongated inner chamber, an upstanding tube therein rising from the bottom of the chamber, a check valve seated on top of the tube in the upper part of said chamber, and a trap valve surrounding the tube and check valve and having its seat on the bottom of the chamber.

10. A valve plug hollowed out to form a chamber and removable from a seat as a unit, said plug including a floor formed with an upstanding tube extending into the chamber, a check valve seated on top of the tube, and a trap valve surrounding the tube and check valve and seated on the floor of the chamber.

In testimony whereof I affix my signature.

FLOYD G. HODSDON.